No. 739,011. PATENTED SEPT. 15, 1903.
F. LAIST.
PROCESS OF TREATING ORES.
APPLICATION FILED NOV. 12, 1902.
NO MODEL.
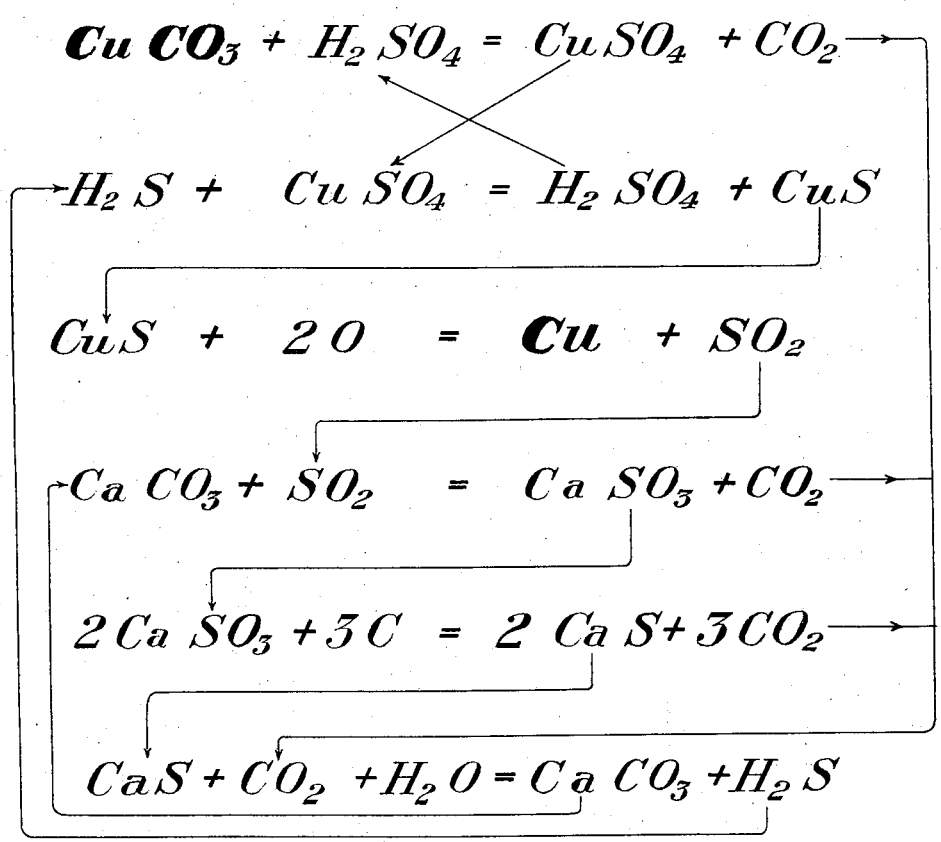
Witnesses:
R A Balderson.
E. T. McKrun.
Inventor:
Frederick Laist
By Byrnes-Townsend
Att'ys.

No. 739,011.                                          Patented September 15, 1903.

UNITED STATES PATENT OFFICE.

FREDERICK LAIST, OF SALT LAKE CITY, UTAH, ASSIGNOR OF TWO-THIRDS TO HUDSON SMITH AND PETER C. BROWN, OF SALT LAKE CITY, UTAH.

PROCESS OF TREATING ORES.

SPECIFICATION forming part of Letters Patent No. 739,011, dated September 15, 1903.

Application filed November 12, 1902. Serial No. 131,052. (No specimens.)

*To all whom it may concern:*

Be it known that I, FREDERICK LAIST, a citizen of the United States, and a resident of Salt Lake City, county of Salt Lake, State of Utah, have invented a new and useful Process of Treating Ores, of which the following is a specification.

This invention is a method for the treatment of ores wherein the solvent liquid and also the precipitant are regenerated. The method is essentially cyclical in character, and the fuel and air employed during certain steps of the method are the only materials which are directly consumed. The chemical reagents employed need only to be added in quantity sufficient to replace the unavoidable losses of manufacture. The method is particularly applicable to the treatment of copper ores and will be so described. It is to be understood, however, that it is not necessarily limited to the treatment of these particular ores.

According to my invention the copper ore is crushed and subjected to the action of a suitable solvent, as sulfuric acid or ammonia. In case the carbonate of copper is treated the dissolving-tank is preferably closed and provided with suitable means for collecting the evolved carbon dioxid. The copper solution resulting from this treatment is separated from the residual ore by any usual method of decantation or filtration and transferred to the precipitation-tanks, which may conveniently comprise a series of covered tanks provided with means for commingling the precipitant and the solution. Here the copper is precipitated as sulfid by a suitable reagent, preferably hydrogen sulfid, and the solvent liquor is regenerated. Instead of precipitating the copper in closed tanks, as described, any suitable device for bringing the gas and liquid into intimate contact may be employed—as, for instance, a tower such as is commonly used for the absorption of hydrochloric acid. If the solvent employed is sulfuric acid, the precipitation will take place in accordance with the reaction (1) $CuSO_4 + H_2S = CuS + H_2SO_4$. 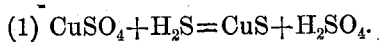

The precipitated sulfid of copper is removed by filtration or otherwise to be treated as hereinafter described, and the regenerated solvent is returned to the dissolving-tanks for the treatment of further quantities of ore.

The hydrogen sulfid necessary for the precipitation of the copper is preferably obtained by reaction between carbon dioxid and a suitable alkaline-earth sulfid in the presence of water. I preferably employ calcium sulfid for this purpose, stirring the same into a thin mud with water and injecting carbon dioxid. Other sulfids—as, for instance, those of barium or strontium—may of course be substituted for the calcium sulfid. The generation of the hydrogen sulfid may be effected in a covered tank or series of tanks similar to those employed for the precipitation of the sulfid of copper or in any other suitable device. The reaction whereby the hydrogen sulfid is generated proceeds according to the equation (2) $CaS + CO_2 + H_2O = CaCO_3 + H_2S$, 

the precipitate being substantially pure carbonate of calcium. This calcium carbonate is subjected in suitable absorption-chambers to the action of gases rich in sulfur dioxid, said gases being preferably obtained as a by-product from the treatment of the precipitated copper sulfid as hereinafter described. By the absorption of these gases the calcium carbonate is converted into sulfite in accordance with the equation (3) $CaCO_3 + SO_2 = CaSO_3 + CO_2$, 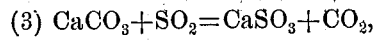

a corresponding quantity of carbon dioxid being set free. Said sulfite is thereafter reduced by carbon to sulfid, according to the reaction (4) $2CaSO_3 + 3C = 2CaS + 3CO_2$. 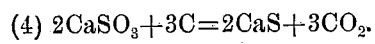

This reduction is best accomplished in a specially-constructed furnace, wherein the mixture may be heated to bright redness in a reducing atmosphere, the sulfid being tapped out from time to time. The precipitated copper sulfid is melted and subjected to the usual converting process whereby metallic copper is obtained. The escaping gases rich in sulfur dioxid are preferably employed as above described for the conversion of calcium carbonate to calcium sulfite.

The calcium sulfid required at the inception of the process is conveniently obtained by the reduction of calcium sulfate by carbon. Thereafter it will preferably be derived, as described, by reduction of the corresponding sulfite formed during the process. It will thus be seen that the solvent liquor—in the specific example given sulfuric acid—is regenerated, as is also the precipitant, hydrogen sulfid. This latter reagent is obtained by the interreaction of two compounds—calcium sulfid and carbon dioxid—both of which are formed during the regular course of the operation.

Reference is made to the accompanying sheet of drawings, wherein the several steps of my method are diagrammatically illustrated. In this diagram the steps, as hereinbefore outlined, are expressed as chemical equations, and arrows are so placed as to indicate the manner in which each product is formed and the manner in which it enters into the cycle of my method. This diagram is for purposes of convenience based upon the treatment of a specific ore by a specific solvent and precipitant. It will be understood, however, that it is merely representative of a single specific application of the general method. The raw material and the final product are indicated for convenience in heavy characters.

I claim—

1. The herein-described method of generating hydrogen sulfid and precipitating copper, which consists in subjecting an alkaline-earth sulfid suspended in water to the action of carbon dioxid, thereby generating hydrogen sulfid and precipitating the carbonate of the alkaline-earth metal, conducting said hydrogen sulfid into the presence of copper in solution, thereby precipitating copper sulfid and forming a solvent liquid, and treating copper ores with said solvent liquid, substantially as described.

2. The herein-described method of generating hydrogen sulfid and precipitating copper which consists in subjecting an alkaline-earth sulfid in the presence of water to the action of carbon dioxid, thereby producing hydrogen sulfid and the carbonate of the alkaline earth, conducting said hydrogen sulfid into the presence of copper in solution thereby precipitating copper sulfid, treating said copper sulfid to obtain therefrom metallic copper and gases rich in sulfur dioxid, absorbing said gases by an alkaline-earth carbonate, thereby forming the sulfite of the alkaline earth, and reducing the said sulfite to sulfid, substantially as described.

3. The herein-described cyclical method for extracting copper from ores and compounds, which consists in dissolving the copper from said ores, treating the solution with hydrogen sulfid to precipitate the copper as sulfid, melting said sulfid and converting it into metallic copper and gases rich in sulfur dioxid, reacting with said gases upon an alkaline-earth carbonate thereby producing carbon dioxid and an alkaline-earth sulfite, reducing the said sulfite to sulfid, generating hydrogen sulfid by reaction between said alkaline-earth sulfid and carbon dioxid in presence of water, and utilizing said hydrogen sulfid for the precipitation of additional quantities of copper sulfid, substantially as described.

4. The herein-described method of generating hydrogen sulfid and precipitating copper, which consists in subjecting an alkaline-earth sulfid in presence of water to the action of carbon dioxid, thereby generating hydrogen sulfid and precipitating the carbonate of the alkaline-earth metal, conducting said hydrogen sulfid into the presence of copper in solution, thereby precipitating copper sulfid and forming a solvent liquid, treating copper ores with said solvent liquid, and collecting said alkaline-earth carbonate and reconverting it into sulfid, substantially as described.

In testimony whereof I affix my signature, in presence of two witnesses, at Salt Lake City, Utah, October 14, A. D. 1902.

FREDERICK LAIST.

Witnesses:
 HUDSON SMITH,
 A. C. SADLER.